(12) United States Patent
Lin

(10) Patent No.: US 7,096,291 B2
(45) Date of Patent: Aug. 22, 2006

(54) METHOD AND DEVICE FOR ARBITRATING BUS GRANT

(75) Inventor: Jiing Lin, Taipei (TW)

(73) Assignee: Via Technologies, Inc., Shindian (TW)

( * ) Notice: Subject to any disclaimer, the term of this patent is extended or adjusted under 35 U.S.C. 154(b) by 248 days.

(21) Appl. No.: 10/319,060

(22) Filed: Dec. 13, 2002

(65) Prior Publication Data

US 2003/0191880 A1    Oct. 9, 2003

(30) Foreign Application Priority Data

Apr. 4, 2002    (TW) .............................. 91106815 A

(51) Int. Cl.
*G06F 13/362*    (2006.01)
(52) U.S. Cl. .................... 710/241; 710/244; 710/116
(58) Field of Classification Search ................ 710/113, 710/116, 240, 241, 244
See application file for complete search history.

(56) References Cited

U.S. PATENT DOCUMENTS

| | | | | |
|---|---|---|---|---|
| 5,168,568 A | * | 12/1992 | Thayer et al. ............... | 710/125 |
| 6,085,274 A | * | 7/2000 | Seeman ....................... | 710/310 |
| 6,412,030 B1 | * | 6/2002 | Adusumilli ................... | 710/33 |
| 6,412,048 B1 | * | 6/2002 | Chauvel et al. .............. | 711/158 |
| 6,763,415 B1 | * | 7/2004 | Tischler ....................... | 710/240 |
| 2003/0177296 A1 | * | 9/2003 | Kurth .......................... | 710/244 |

* cited by examiner

*Primary Examiner*—Rehana Perveen
*Assistant Examiner*—Trisha Vu
(74) *Attorney, Agent, or Firm*—Madson & Austin

(57) ABSTRACT

A method for arbitrating a bus grant among a plurality of master devices for access to a shared bus is disclosed. The method includes the steps of starting to accumulatively count time in response to a data transfer request signal outputted by one of the master devices for requesting a data transfer, and re-estimating a bus-utility condition for the one of the master devices to access to the shared bus when a preset threshold value of time is counted up. In addition, an arbiter for a bus grant among a plurality of master devices for access to a shared bus is disclosed. The arbiter is characterized by including a plurality of timer devices in communication with the plurality of master devices, respectively.

17 Claims, 4 Drawing Sheets

METHOD AND DEVICE FOR ARBITRATING BUS GRANT

FIELD OF THE INVENTION

The present invention relates to a method for arbitrating bus grant, and more particularly to a method for arbitrating bus grant among a plurality of master devices. The present invention also relates to an arbiter for bus grant.

BACKGROUND OF THE INVENTION

Please refer to FIG. 1 which is a schematic diagram illustrating the transmission among a plurality of master devices 111, 112, . . . , 11n and a plurality of target devices 121, 122, . . . , 12n via a shared bus 10. In order to coordinate the data transmission, an arbiter 13 is provided between the master devices 111, 112, . . . , 11n and the shared bus 10 to arbitrate the bus grant to which of the master devices in a certain period. Generally, a fixed priority or a Round-Robin mechanism is employed for the arbitration of the shared bus architecture.

In order to increase the utility rate of the shared bus 10, a retry mechanism is also widely applied to the current bus protocol, e.g. a peripheral component interconnect (PCI) bus protocol. That is, when the dominating one of the master devices, for example the master device 111, outputs a data transfer request signal to the target device 121 but the target device 121 cannot achieve the data transaction at that time, the target device 121 will output a retry signal to the master device 111. In response to the retry signal, the arbiter 13 will rearrange the bus grant order. In other words, the master device 111 has to wait a certain period of time to become a candidate for the bus grant again. When it is the turn again of the master device 111 to dominate the shared bus 10, a data transfer request signal is re-outputted to the target device 121. By this way, the shared bus 10 will not be idly occupied by the incomplete data transaction between the master device 111 and the target device 121.

A conventional retry mechanism for use with a PCI bus is illustrated hereinafter with reference to FIG. 2. During the data transaction between the master device 111 and the target device 121, the master device 111, first of all, obtains the bus grant from the arbiter 13 and then sends out a FRAME# signal and an IRDY# signal to inform the target device 121 that it is ready for the data transaction. If the target device 121 is also ready for the data transaction, the target device 121 will send out a TRDY# signal and then the master device 111 starts the data transaction. Otherwise, the target device 121 will output a STOP# signal to stop the data transaction. The above situation is a typical retry mechanism since no data transaction has been completed between the master device 111 and the target device 121.

So far, the arbiter coordinates the bus grant only depending on the request signals from the master devices. The application of the retry mechanism, under this circumstance, possibly causes the "starve" of the master device. For example, for some bus configurations or in a long-term operation, it possibly occurs that one of the master devices cannot complete the data transaction all the time since the target device happens to be busy whenever the master device gets the bus grant. Accordingly, the transaction cannot be achieved for a long time so as to "starve" the master device.

Therefore, the purpose of the present invention is to develop an arbitrating method and device for coordinating the bus grant to deal with the above situations encountered in the prior art.

SUMMARY OF THE INVENTION

An object of the present invention is to provide an arbitrating method and device for coordinating a bus grant for avoiding the "starve" phenomenon of a master device.

According to an aspect of the present invention, there is provided a method for arbitrating a bus grant among a plurality of master devices for access to a shared bus. The method includes the steps of starting to accumulatively count time in response to a data transfer request signal outputted by one of the master devices for requesting a data transfer, and re-estimating a bus-utility condition for the one of the master devices to access to the shared bus when a preset threshold value of time is counted up.

Preferably, the method further includes a step of resetting the counted time to an initial value when the data transfer is completed.

Preferably, the completion of the data transfer is determined in response to a data transfer completion signal controlled by the one of the master devices and a target device, which associates with the data transfer.

In a preferred embodiment, the shared bus is a PCI bus and the data transfer completion signal includes a target ready signal (TRDY) and an initiator ready signal (IRDY), both at low levels. The initiator ready signal (IRDY) is from the one of the master devices, and the target ready signal (TRDY) is from the target device In another preferred embodiment, the shared bus is a P6 bus in communication with a plurality of central processor units (CPUs) and a north bridge chip, and the data transfer completion signal is realized by a decoding operation for RS#[2:0].

Preferably, the bus-utility condition is an assigned priority, an assigned transaction period of time, or a combination thereof. In the bus-utility condition re-estimating step, preferably, the assigned priority is enhanced or the assigned transaction period of time is prolonged after the preset threshold value of time is counted up. Preferably, the assigned priority is enhanced and the assigned transaction period of time is prolonged after the preset threshold value of time is counted up in the bus-utility condition re-estimating step.

According to another aspect of the present invention, there is provided an arbiter for a bus grant among a plurality of master devices for access to a shared bus. The arbiter is characterized by including a plurality of timer devices in communication with the plurality of master devices, respectively. The timer devices generate respective time accumulation values in response to data transfer request signals from the master devices corresponding thereto and the time accumulation values are referred to for re-estimating bus-utility conditions of the master devices.

Preferably, the bus-utility conditions include assigned priorities, assigned transaction periods of time, and a combination thereof.

Preferably, the bus-utility conditions are re-estimated when any of the time accumulation values exceeds a preset threshold value.

Preferably, the timer devices are reset in response to respective data transfer completion signals controlled by the master devices and the corresponding target devices when respective data transfers are completed. Preferably, the shared bus is a PCI bus.

Preferably, the timer devices are reset in response to respective data transfer completion signals outputted by target devices corresponding to the master devices outputting the data transfer request signals, respectively, when respective data transfers between the corresponding master devices and target devices are completed. The shared bus is preferably a P6 bus in communication with a plurality of central processor units (CPUs) and a north bridge chip, and any of the data transfer completion signals is obtained by decoding for RS#[2:0].

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
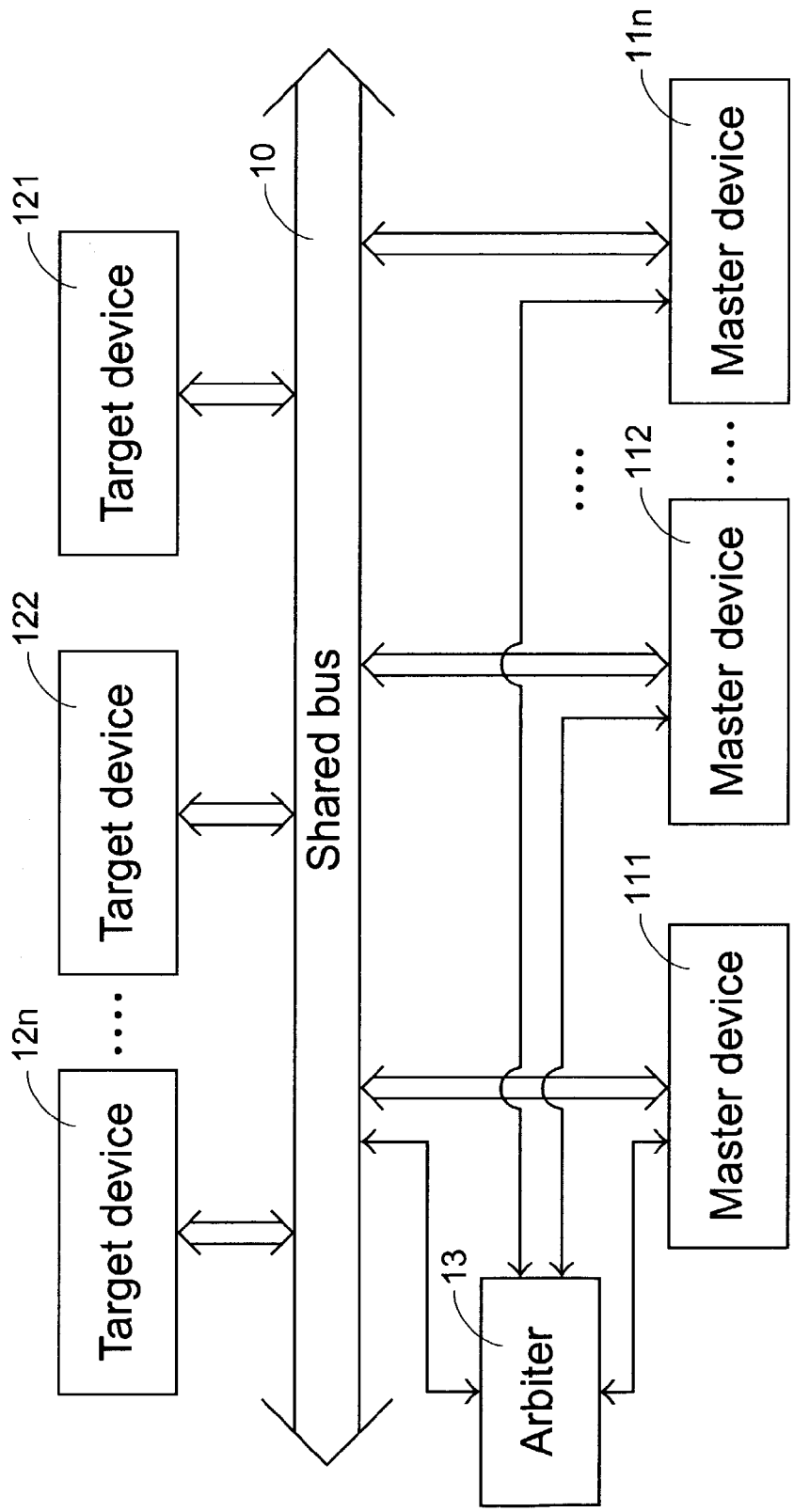
FIG. 1 is a schematic diagram illustrating the conventional transmission among a plurality of master devices and a plurality of target devices via a shared bus.
Figure 2:
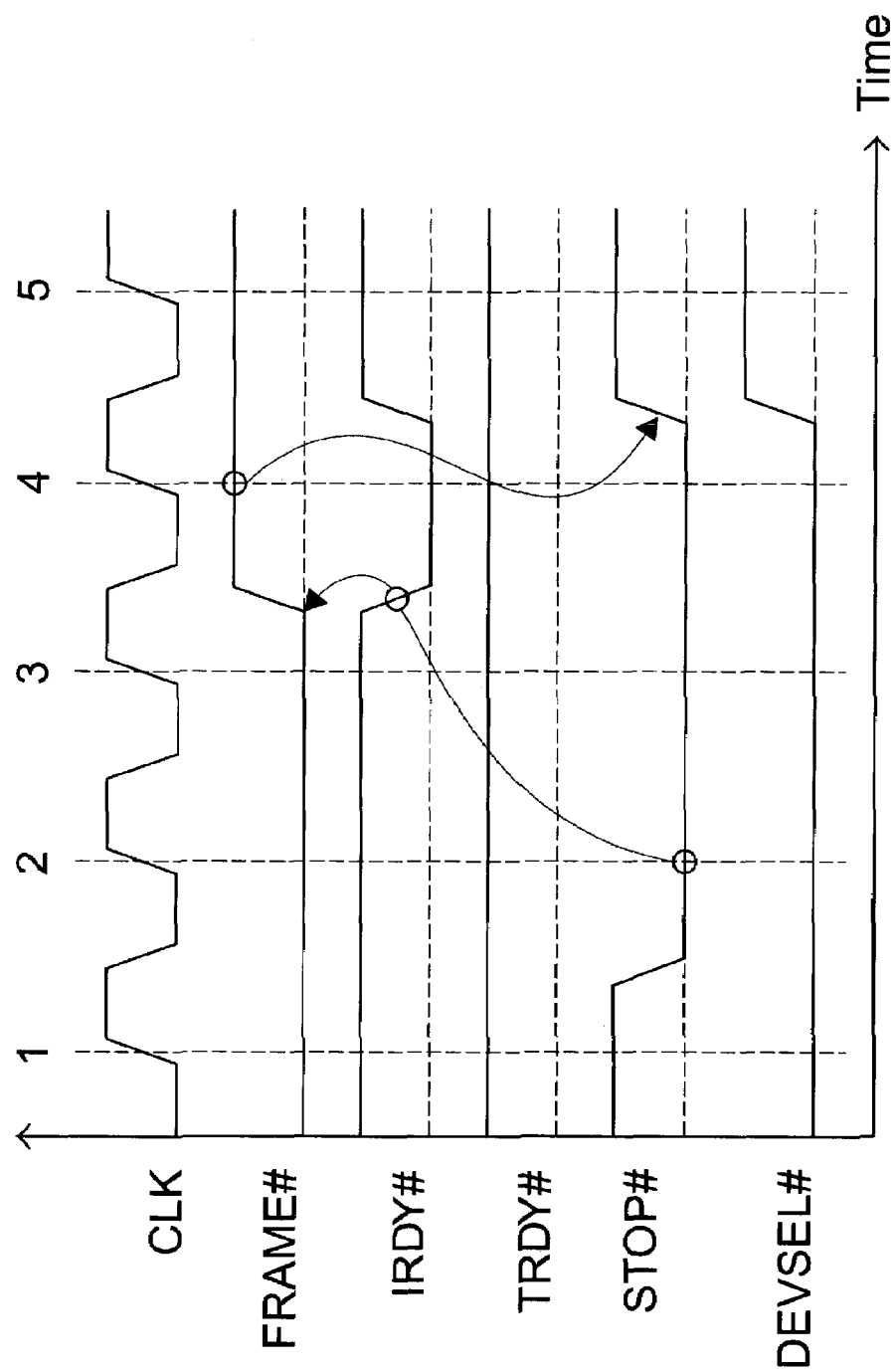
FIG. 2 is a schematic waveform diagram illustrating a conventional retry mechanism for use with a PCI bus.
Figure 3:
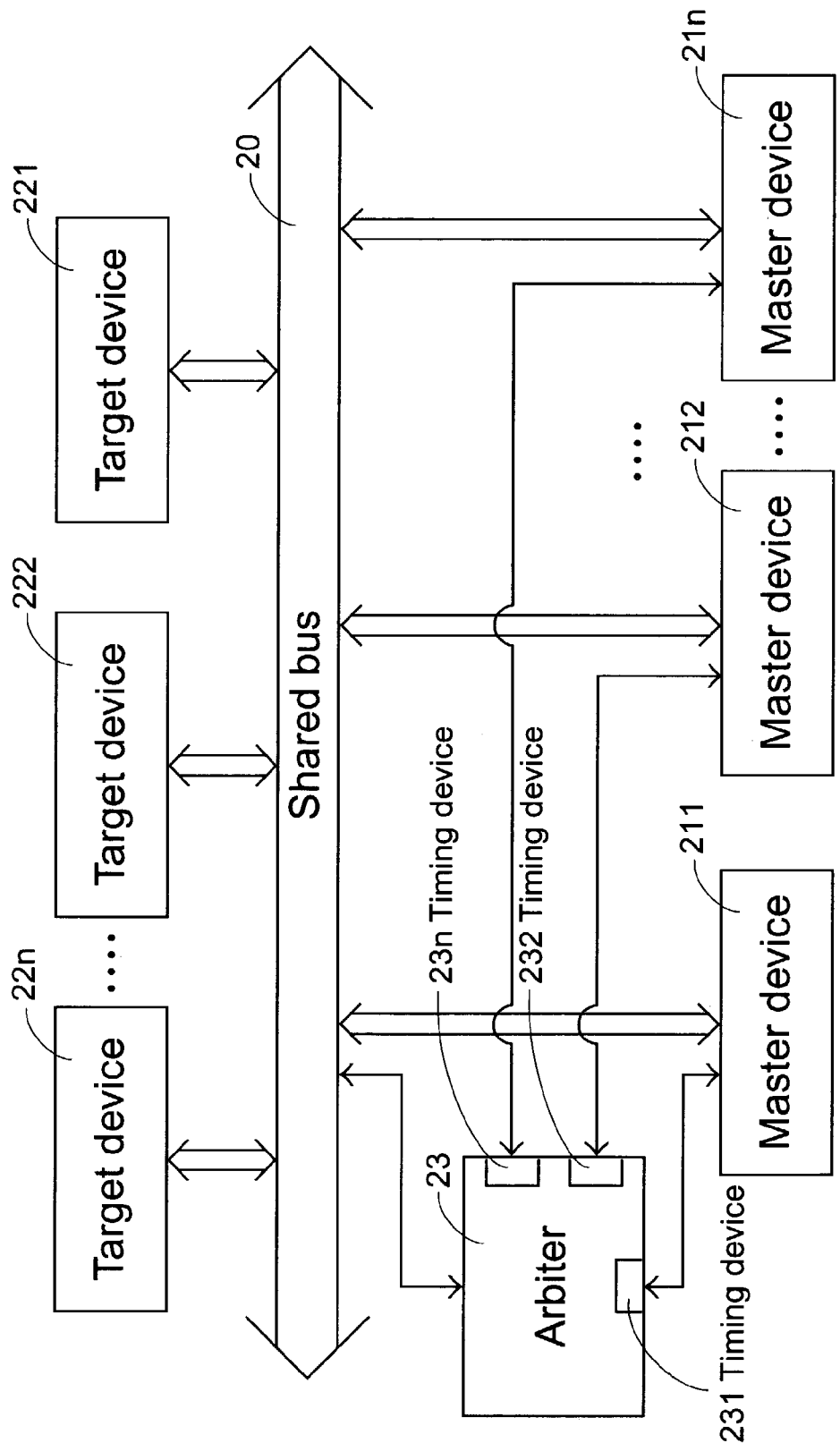
FIG. 3 is a schematic diagram illustrating the use of a preferred embodiment of an arbiter according to the present invention for coordinating the transmission among a plurality of master devices and a plurality of target devices.
Figure 4:
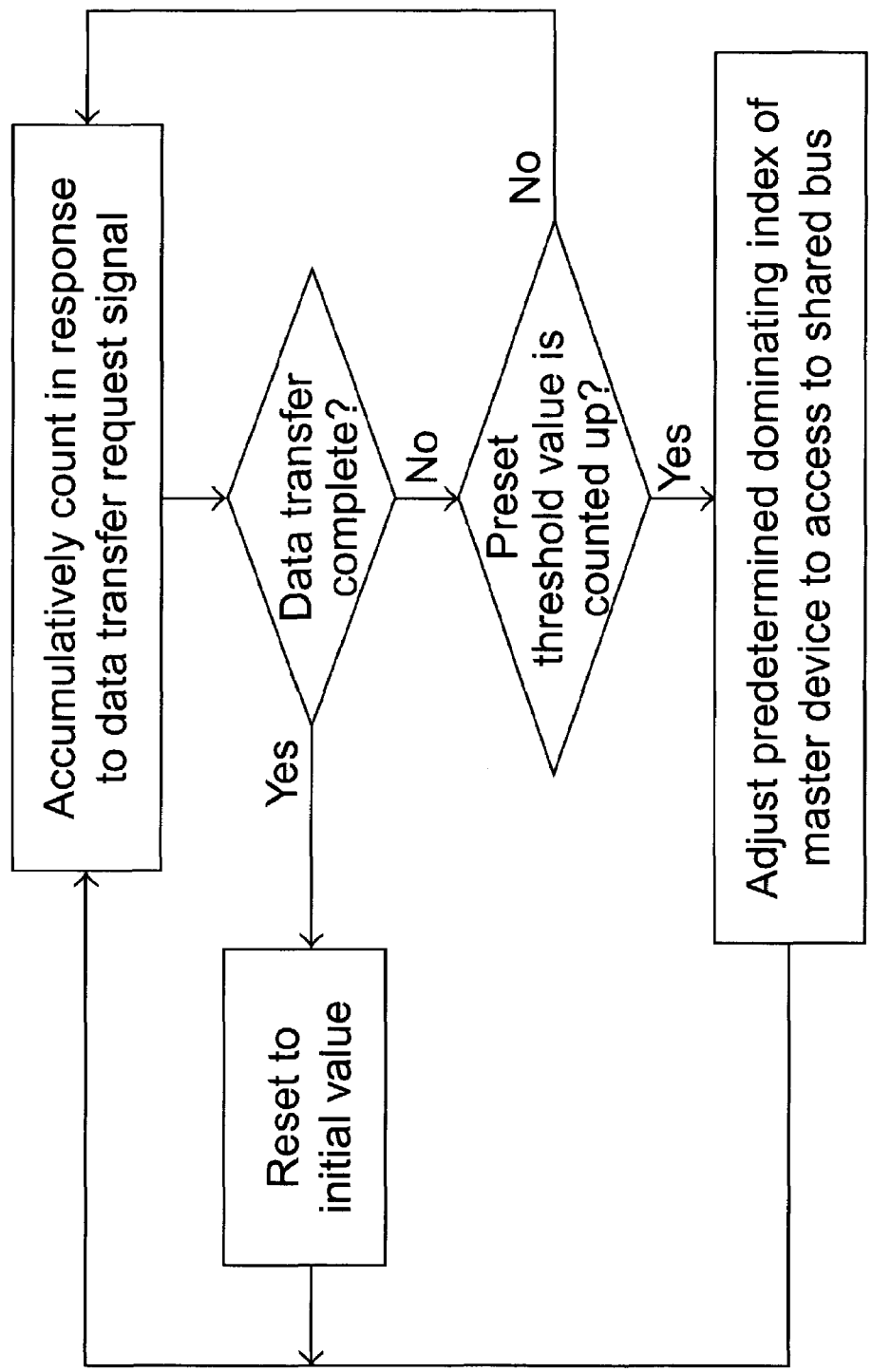
FIG. 4 is a flowchart illustrating a preferred embodiment of an arbitrating method for coordinating the bus grant according to the present invention.

Please refer to FIG. 3. A plurality of master devices 211, 212, ..., 21n and a plurality of target devices 221, 222, ..., 22n are interconnected via a shared bus 20. An arbiter 23 is used for coordinating the bus grant. The arbiter 23 includes a plurality of timer devices 231, 232, ..., 23n in communication with the master devices 211, 212, ..., 21n, respectively. Those timer devices 231, 232, ..., 23n are implemented by counters in this embodiment. After one of master devices 211, 212, ..., 21n, e.g. the master device 211, outputs a data transaction signal, e.g. a data transfer request signal, the corresponding timer device, i.e. the timer device 231, starts to accumulatively count from an initial value. When the requested data transfer is done, the outputs of the master device 211 and one of the target devices, e.g. the target device 221, indicate a data transfer completion signal so as to reset the timer device 231 to the initial value. When a preset threshold value is counted up, it means that the master device 211 has waited for a long time since it requested a data transfer. Therefore, a predetermined dominating index of the master device 211, which relates to the bus-utility preference for the master device 211 to access to the shared bus 20, is re-estimated. For example, an assigned priority of the master device 211 is enhanced and/or an assigned transaction period of time thereof is prolonged. The above arbitrating method is summarized in the flowchart of FIG. 4.

When the shared bus 20 is, for example, a peripheral component interconnect (PCI) bus, the data transfer completion signal includes a target ready signal (TRDY) and an initiator ready signal (IRDY), both at low levels. In other words, when detecting that both the signal TRDY from the target device 221 and the signal IRDY from the master device 211 are at the low levels, the arbiter 23 determines that the data transfer of the master device 211 is completed. Hence, the time accumulation value of the corresponding timer device 231 is reset to the initial value, e.g. zero, and later on, the corresponding timer device 231 re-starts to count in response to another data transfer request signal from the master device 211.

On the other hand, when the shared bus 20 is a P6 bus in communication with a plurality of central processor units (CPUs) and a north bridge chip, a retry signal and a data transfer completion signal outputted from the north chip is realized by a decoding operation at a RS#[2:0] pin of the P6 bus. For example, a retry signal is indicated when RS#[2:0] is "001", an idle status is indicated when RS#[2:0] is "000", and a data transfer completion signal is indicated when RS#[2:0] is neither "001" nor "000". When detecting the data transfer completion signal from the RS#[2:0] pin of the master device 211, the arbiter 23 determines that the master device 211 has completed the data transmission. Then, the time accumulation value of the corresponding timer device 231 is reset to zero. On the other hand, when the arbiter 23 detects the retry signal from the RS#[2:0] pin of the master device 211, it is determined that the master device 211 have not completed the data transmission. Hence, the time value of the corresponding timer device 231 is continuously accumulated. When the time accumulation value of the timer device 231 is larger than a preset threshold value, the arbiter 23 changes the predetermined dominating index of the master device 211. For example, an assigned priority of the master device is promoted or an assigned transaction period of time is prolonged.

According to the present invention, the preference of each master device to access to the shared bus can be optionally adjusted, so the "starve" problem of the master device can be efficiently solved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for arbitrating a bus grant among a plurality of master devices for access to a shared bus, comprising the steps of:
    starting to accumulatively count time in response to a data transfer request signal outputted by one of said master devices for requesting a data transfer;
    continuing to count time when a retry signal is issued in response to said data transfer request signal; and
    re-estimating a bus-utility condition for said one of said master devices to access to said shared bus when a preset threshold value of time is counted up.

2. The method according to claim 1 further comprising a step of resetting the counted time to an initial value when said data transfer is completed.

3. The method according to claim 2 wherein the completion of said data transfer is determined in response to a data transfer completion signal controlled by said one of said master devices and a target device, which associates with said data transfer.

4. The method according to claim 3 wherein said shared bus is a PCI bus, and said data transfer completion signal includes a target ready signal (TRDY) and an initiator ready signal (IRDY), both at low levels.

5. The method according to claim 4 wherein said initiator ready signal (IRDY) is from said one of said master devices, and said target ready signal (TRDY) is from said target device.

6. The method according to claim 3 wherein said shared bus is a P6 bus, said master and target devices are a central processor unit and a north bridge chip.

7. The method according to claim 6 further comprising a step of resetting said counted time to an initial value when said data transfer is completed, wherein the completion of said data transfer completion signal is realized by a decoding operation for RS#[2:0].

8. The method according to claim 1 wherein said bus-utility condition is selected from a group consisting of an assigned priority, an assigned transaction period of time, and a combination thereof.

9. The method according to claim 8 wherein in said bus-utility condition re-estimating step, said assigned priority is enhanced or said assigned transaction period of time is prolonged after said preset threshold value of time is counted up.

10. The method according to claim 8 wherein in said bus-utility condition re-estimating step, said assigned priority is enhanced and said assigned transaction period of time is prolonged after said preset threshold value of time is counted up.

11. An arbiter for a bus grant among a plurality of master devices for access to a shared bus, characterized by comprising a plurality of timer devices in communication with said plurality of master devices, respectively, wherein said timer devices generate respective time accumulation values in response to data transfer request signals from said master devices corresponding thereto and continue accumulating said respective time accumulation values when respective retry signals are issued in response to said data transfer request signals, and said time accumulation values are referred to for re-estimating bus-utility conditions of said master devices.

12. The arbiter according to claim 11 wherein said bus-utility conditions are selected from a group consisting of assigned priorities, assigned transaction periods of time, and a combination thereof.

13. The arbiter according to claim 11 wherein said bus-utility conditions are re-estimated when any of said time accumulation values exceeds a preset threshold value.

14. The arbiter according to claim 11 wherein said timer devices are reset in response to respective data transfer completion signals controlled by said master devices and corresponding target devices when respective data transfers are completed.

15. The arbiter according to claim 11 wherein said shared bus is a PCI bus.

16. The arbiter according to claim 11 wherein said timer devices are reset in response to respective data transfer completion signals outputted by target devices corresponding to said master devices outputting said data transfer request signals, respectively, when respective data transfers between said corresponding master devices and target devices are completed.

17. The arbiter according to claim 16 wherein said shared bus is a P6 bus, and any of said data transfer completion signals is obtained by decoding for RS#[2:0].

* * * * *